United States Patent [19]

Brown et al.

[11] Patent Number: 4,972,461
[45] Date of Patent: Nov. 20, 1990

[54] CALL MESSAGE DELIVERY SYSTEM AND METHOD

[75] Inventors: Percy B. Brown, East Brunswick; Nga V. Chau, Middletown; Tung-Hai Hsiao, Freehold; Georg K. Karawas, West Long Branch; Richard E. LeCronier, New Monmouth; Dawn R. Parrott, Neptune; Thomas L. Russell, Jr., Colts Neck; Wen-Ping Ying, East Brunswick, all of N.J.

[73] Assignee: AT&T Bell Laboratories, Murray Hill, N.J.

[21] Appl. No.: 410,559

[22] Filed: Sep. 20, 1989

[51] Int. Cl.$^5$ ...................... H04M 3/50; H04M 15/12
[52] U.S. Cl. ........................................ 379/67; 379/89; 379/91; 379/112
[58] Field of Search ...................... 379/89, 88, 67, 214, 379/213, 212, 112, 91

[56] References Cited

U.S. PATENT DOCUMENTS 4,825,460  4/1989  Carter et al. .......................... 379/67
4,878,239 10/1989  Solomon et al. ....................... 379/67

Primary Examiner—Thomas W. Brown
Attorney, Agent, or Firm—John A. Caccuro

[57] ABSTRACT

A call delivery service (CDS) apparatus and method are disclosed which enable non-subscriber callers to a common carrier network to bill a voice message delivery to their billing code, and to check the delivery status of the message from the network during a subsequent call. Optionally, at the caller's request, CDS can deliver the message status to the caller at a predesignated station. In one embodiment the caller can optionally request a response from the message recipient or answering party at the called station.

23 Claims, 8 Drawing Sheets

FIG. 7

DATA FILE
BILLING CODE – DATA RECORD
MESSAGE STATUS TABLE 700

| | |
|---|---|
| MESSAGE AND/OR STATUS DELIVERED | 703 |
| MESSAGE SCHEDULED FOR DELIVERY | 701 |
| STATUS NOTIFICATION WAITING TO BE SCHEDULED | 707 |
| STATUS INSIDE DELIVERY WINDOW WAITING FOR NEXT ATTEMPT | 708 |
| MESSAGE WAITING TO BE SCHEDULED | 711 |
| MESSAGE CURRENTLY ATTEMPTING DELIVERY | 702 |
| STATUS NOTIFICATION ATTEMPTING DELIVERY | 710 |
| MESSAGE DELIVERY CANCELLED | 705 |
| NEW DELIVERY SESSION | 709 |
| MESSAGE IS LOCKED DURING STATUS | 712 |
| DELIVERY UNSUCCESSFUL | 704 |
| MESSAGE DELIVERED/NO REPLY | 706 |

TRACE TABLE I 720

| | |
|---|---|
| MESSAGE DELIVERED TO DESIRED PERSON | 721 |
| MESSAGE DELIVERED TO MESSAGE TAKER | 722 |
| REPLY OBTAINED | 723 |
| MESSAGE (AUTO|SUPERVISED|INTRO) DELIVERED | 724 |
| STATUS NOTIFICATION DELIVERED | 725 |
| ATTENDANT CANCELLED MESSAGE | 726 |

TRACE TABLE II 740

| | |
|---|---|
| BILLING CODE ENTERED | 741 |
| STATUS ROUTINE ENTERED | 742 |
| CALLER'S NAME RECORDED | 744 |
| DESTINATION TELEPHONE NUMBER ENTERED | 751 |
| MESSAGE RECORDED | |
| MESSAGE RE-RECORDED | |
| MESSAGE COPIED | 743 |
| MULTIPLE MESSAGE | |
| MESSAGE CANCELLED | 752 |
| AUTOMATIC VS SUPERVISED (SET IF SUPERVISED DELIVERY) | 745 |
| STANDARD VS CUSTOM (SET IF CUSTOM DELIVERY) | 749 |
| PERSON TO PERSON VS MESSAGE TAKER (SET IF MESSAGE TAKER) | 746 |
| STATUS NOTIFICATION TELEPHONE NUMBER ENTERED | 748 |
| RECIPIENT RESPONSE | 747 |
| RESTRICTED DELIVERY | 750 |

DELIVERY SCHEDULE TABLE 770

| YEAR | MONTH | DAY | HOUR | MINUTE | | |
|---|---|---|---|---|---|---|
| STOP | | | | | | 771 |
| NOTIFICATION TIME | | | | STOP | | 772 |
| | | | | | | 773 |

FIG. 8

BILLING CODE TABLE 801

| CARD TYPE | LENGTH | FORMAT |
|---|---|---|
| AMERICAN EXPRESS | 15 | [340000-349999]-xxxx xxxx 1 |
| MASTER CARD | 16 | [510-519]xxx - xxxx xxxx x1<br>[5200-5299]xx-xxxx xxxx x1<br>[54000-54999]x-xxxx xxxx x1<br>[55000-55999]x-xxxx xxxx x1 |
| VISA CARD | 13<br>16 | 4xxxxx - xxxx xxxx x1<br>4xxxxx - xxxx xx1 |
| CAS CARD | 20<br>21 | 891yyy-NPA-Nxx-xxxx-L-PINN<br>891-ZZZ-xNx-[0/1]xx-xxxL-PINN |
| AT&T CARD | 14 | NPA-Nxx-xxxx |

FIG. 9

BILLING CODE - VOICE FILE 901

| CALLER | RECIPIENT | RESPONSE | MESSAGE |
|---|---|---|---|
| 902 | 903 | 904 | 905 |

FIG. 10

MESSAGE IDENTIFICATION CODE FILE

| |
|---|
| YEAR |
| MONTH |
| DAY |
| HOUR |
| MINUTE |
| SECOND |
| SERVICE UNIT |
| SERVICE UNIT LINE NUMBER |

CALL MESSAGE DELIVERY SYSTEM AND METHOD

CROSS-REFERENCE TO RELATED APPLICATION

Related subject matter is disclosed in the following applications filed concurrently herewith and assigned to the same assignee hereof: U.S. Pat. application Ser. No. 410,556, U.S. Pat. No. 4,939,771, entitled "Attendant-Controlled Call Message Delivery System and Method" inventors, P. B. Brown, et al.; and U.S. Pat. application Ser. No. 410,450 entitled "Call Message Delivery System and Method Utilizing Caller-Selected System Announcements," inventors, P. B. Brown, et al.

TECHNICAL FIELD

This invention relates to a call messaging system and, more particularly, to a calling card based call delivery system and method.

BACKGROUND OF THE INVENTION

Voice Messaging Services (VMS) are becoming increasingly important in today's communications markets. However, many users are not certain that their message has been received at the called station or by the intended recipient thereat. Consequently, confirmation of the receipt of the message is often requested by the calling party from the called party.

In one prior art VMS system where each message sender is a subscriber of the system, provisions are made for a message recipient's response to be stored in the user's mailbox. However, when the message sender is not a subscriber of the system, no mailbox exists and, consequently, no response can be received. Undesirably, system subscribers who receive messages from non-subscriber message senders are often requested to call the non-subscriber senders directly with their response which results in added time and, possibly, expense to the system subscribers.

The problem may be more acute when the VMS are provided by the public switched network, since a greater number of telephone users may not be subscribers to the VMS and, consequently, will not have the requisite message mailboxes to receive voice or confirmation messages. Thus, it is a continuing problem to provide message delivery confirmation and responses when providing VMS to users of the public switched network.

SUMMARY OF THE INVENTION

In accordance with the present invention, an illustrative Call message Delivery System (CDS) apparatus and method are disclosed for providing voice messaging services (VMS) which utilize a billing code (e.g., credit card number) to establish a status memory location for storing the delivery status of a voice message and which can, subsequently, be checked by the caller. According to the invention, the CDS is utilized with a common carrier network enabling a non-subscriber caller to bill, to his/her billing code, a request to deliver a voice message to a called party. The CDS, in response to the caller's request, establishes a status memory location identifiable using the caller's billing code. In response to a subsequent call from the caller, the CDS checks the status memory location and outputs a message indicating the delivery status of the voice message. Optionally, at the caller's request, CDS can deliver a message status notification call to a station designated by the caller.

According to another aspect of the invention, CDS enables the caller to request and receive a voice message response from the called party or answering party at the called station.

BRIEF DESCRIPTION OF THE DRAWING

In the drawing:

FIG. 7 illustrates a series of tables which comprise a data record for each billing code message delivery request;

FIG. 8 illustrates a billing code table used by the CDS;

FIG. 9 illustrates a voice file utilized by CDS; and

FIG. 10 illustrates a message identification code file.

DETAILED DESCRIPTION

Figure 1:
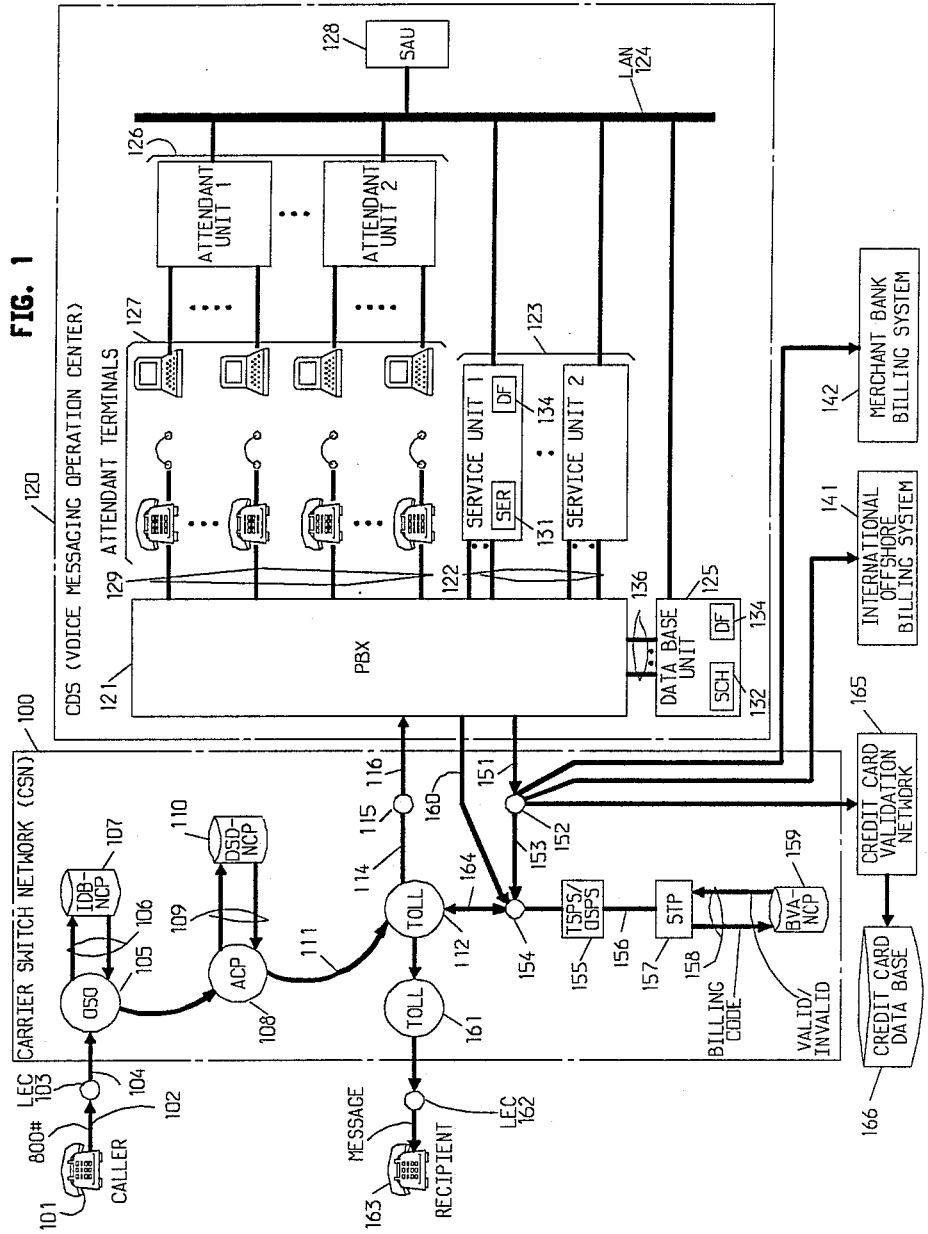
FIG. 1 is a system block diagram of the present call message delivery system (CDS) and its connection to a carrier switch network.
Figure 2:
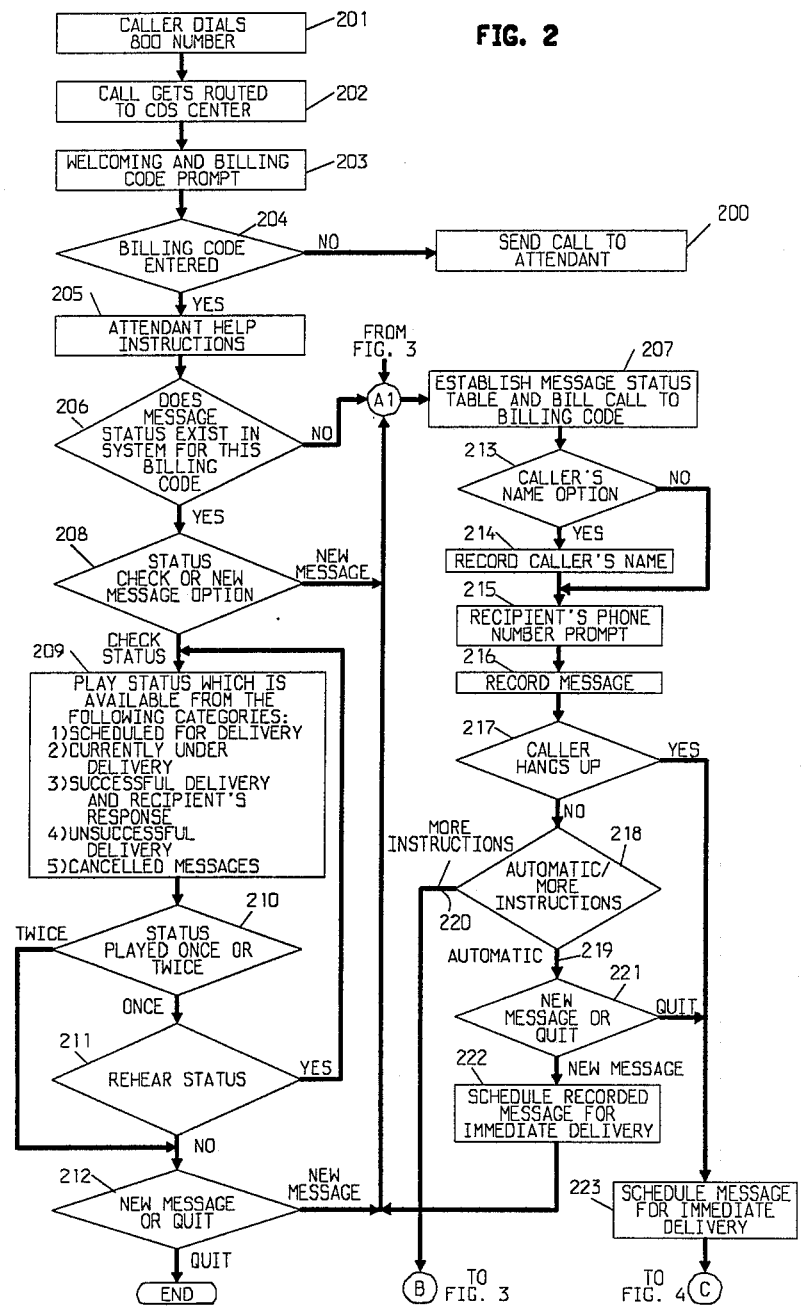
FIGS. 2–6 are a series of flow charts of programs to control the various features of the present CDS.
Figure 3:
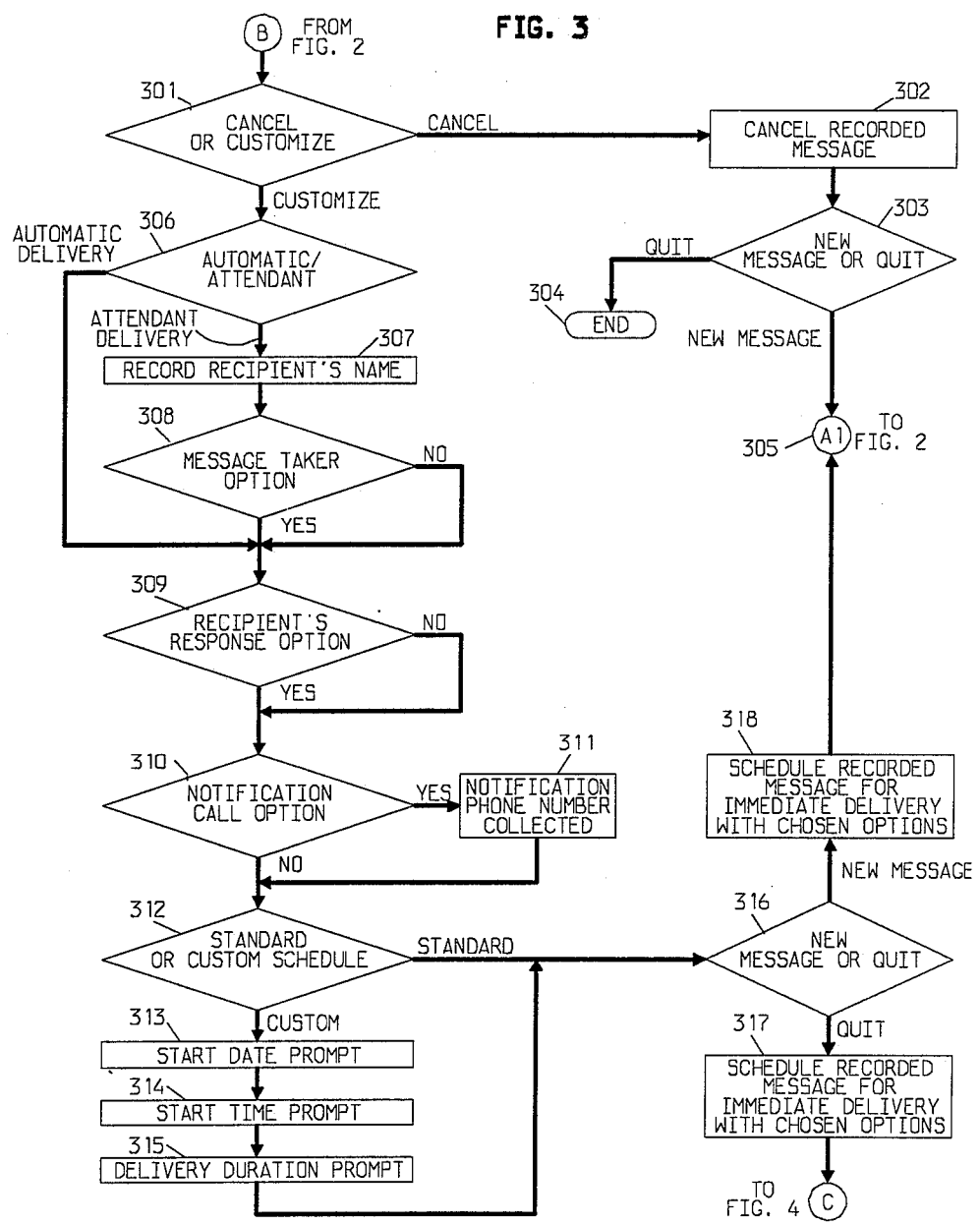
Figure 4:
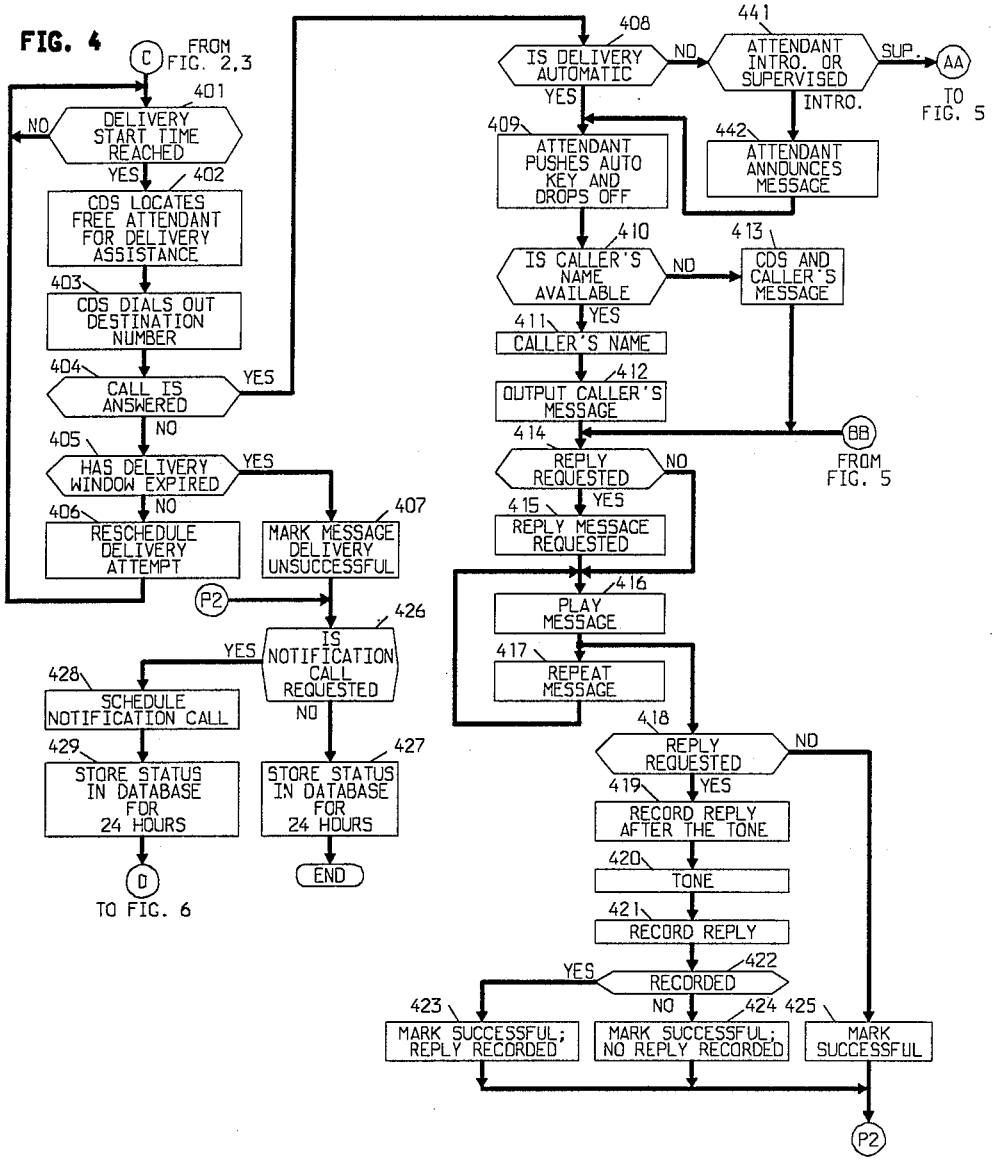
Figure 5:
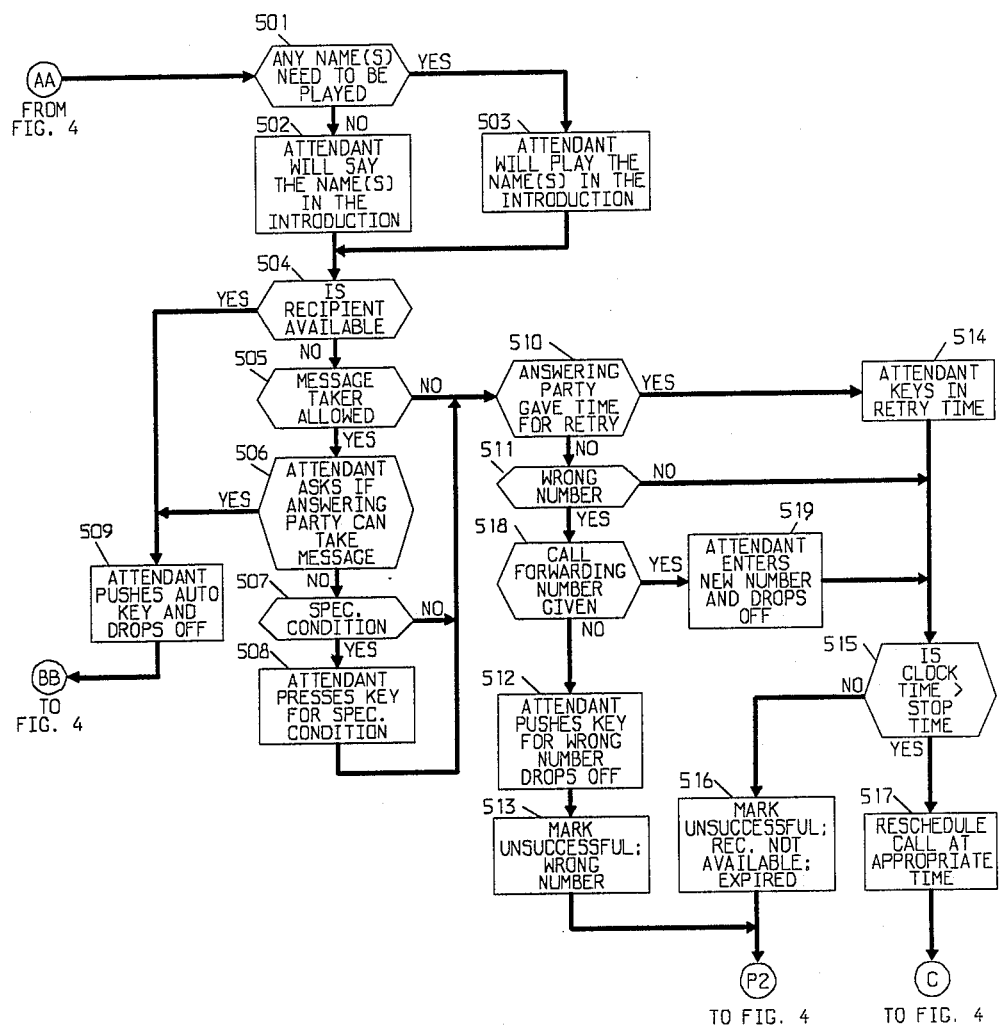

Before proceeding with the operating description of the CDS, it should be recognized that the apparatus and method of the CDS may be adapted for use with a variety of different systems which can be arranged as shown in FIG. 1. Since the various systems shown in FIG. 1 utilize a variety of hardware and programming techniques, no attempt is made to describe the existing programs used to control these various systems. However, using the following description as a guide, the operations of the CDS can be readily integrated into the control structure of the various systems of FIG. 1, and must be tailored to cooperate with other features and operations of those systems. In order to avoid confusion and enable those skilled in the art to practice the claimed invention, this specification will describe the operation of the CDS using the block diagram of FIG. 1, the flow charts of FIGS. 2–6 and the various tables shown in FIGS. 7–9 which, together, are used to describe operating steps and the various data required to implement the CDS. In the following description, the first digit of an element's reference number designates the figure where the element is located (e.g., 101 is located in FIG. 1).

1. Apparatus Description

With reference to FIG. 1, a block diagram of a Voice Messaging Operation Center (VMOC) is adapted to provide an illustrative embodiment of the present CDS 120. The CDS is shown connected to a Carrier Switch Network (CSN) 100. The drawing illustrates an originating Local Exchange Carrier (LEC) 103 which serves the call originator (i.e., caller or message sender) at station set 101 and a terminating LEC 162 which serves the message recipient at destination station set 163. The station sets 101 and 163 may, illustratively, be either rotary or touch-tone phones. FIG. 1 also discloses Carrier Switch Network (CSN) 100 illustratively including an Originating Screening Office (OSO) 105, Network Control Points (NCP) 107, 110 and 159, Action Point (ACP) 108, toll offices 112 and 161, Traffic Service Position System (TSPS) 155, Signal Transfer Point (STP) 157, Service Nodes (SN) 115, 152 and 154, and CDS 120. The International Offshore Billing and Settlement (IOBS) 141 and Merchant Bank Billing System (MBS) 142 (e.g., Barnett Merchant Services, Inc.) provide billing information services to CDS 120.

The structural details of the LECs, toll offices, NCPs, ACP, STP and TSPS form no part of the present invention and are only described herein to the extent necessary for an understanding of the CDS system.

Each of the LECs, by way of example, is an electronic program-controlled telephone system such as a No. 1ESS (Electronic Switching System) or a 5ESS ® switch. The No. 1ESS is described in the *Bell System Technical Journal* (BSTJ), Sept., 1964, Volume XLIII, Number 5, Parts 1 and 2; and in the R. W. Downing, et al., U.S. Pat. No. 3,570,008 of Mar. 9, 1971. The No. 5ESS is extensively described in *AT&T Technical Journal*, Vol. 64, No. 6, part 2, pp. 1305-1564, July/Aug., 1985. The above-identified disclosures and the citations referred to therein may be consulted for a complete understanding of the construction and operations of a typical LEC office.

The OSO 105 may also be implemented in a similar manner as the above-described ACP 108.

An NCP is a processor-controlled centralized data base facility. By way of example, NCP may comprise an AT&T Company 3B20D equipped with disk storage. The operation of an NCP is described, for example, in the D. Sheinbein, et al., article on pp. 1737-1744 of *Bell System Technical Journal* (BSTJ), Sept., 1982, Volume 61, No. 7, part 3. The changes in the operation of NCP to perform the disclosed CDS/NCP 110 features is described in later paragraphs.

A general description of an ACP is described in U.S. Pat. No. 4,611,094 issued on Sept. 9, 1986, to R. L. Asmuth, et al. The ACP are offices which serve as access points to the Common Channel Signaling (CCS or CCIS) network. One link of the CCS network, i.e., 109, interconnects ACP 108 with NCP 110. Other links of the CCS network include link 106 which interconnects OSO 105 to NCP 107 and link 158 which interconnects STP with NCP 159.

The CCS system is basically a packet switching system for routing messages in accordance with their address data contents. CCS system features are disclosed in the Feb., 1978, *Bell System Technical Journal* (BSTJ) No. 2 and in W. B. Smith, et al., U.S. Pat. No. 3,624,613 of Nov. 30, 1971.

Each toll office may be, illustratively, an electronic program-controlled telephone system of the No. 4 ESS design with Common Channel Signaling (CCS or CCIS), as disclosed in the *Bell System Technical Journal* (BSTJ), Sept., 1977, Volume 56, No. 7.

A TSPS for serving credit card calls is disclosed in U.S. Pat. No. 3,484,560 issued to R. J. Jaeger, Jr., on Dec. 16, 1969, and the Dec., 1970, article in *Bell System Technical Journal* (BSTJ) 49, No. 10, page 2417, et seq., which describes the structure and operations of TSPS equipment.

An STP 157 is described in the book, "Engineering and Operations in the Bell System", Second Edition, published by AT&T Bell Laboratories, at pages 292 through 294.

2. CDS (VMOC) Description

With continued reference to FIG. 1, the following paragraphs describe the major components of CDS 120 required to provide the VMS capability. The major components of the CDS 120 are a PBX switch 121 (e.g., an AT&T System 85 PBX), Service Units (SU) 123 (e.g., AT&T 6386E Work Group Stations (WGSs)), Data Base Unit (DBU) 125 (e.g., AT&T 3B2/500), Attendant Units 126 (e.g., AT&T 6386E WGS), Attendant Terminals 127, Local Area Network (LAN) 124 (e.g., AT&T STARLAN 10 network), and the System Administration Unit (SAU) 128 (e.g., AT&T 3B2/500). In order to keep a compact figure for illustration purposes, some minor peripherals, such as printers, modems and tape drives utilized with CDS 120 are not shown in FIG. 1. The following sections describe the physical arrangements and the functions performed by each of the components in accordance with the operation of the present invention.

PBX 121 is the gateway between users (e.g., message senders and message recipients) and the other CDS 120 components. The PBX has direct connections (e.g., T1 carrier via facility 116) to Service Node (SN) 115 to receive service calls (e.g., using MEGACOM ® 800 service) and, similarly, to deliver calls via facility 151 to SN 152. The lines 129 of PBX 121 provide voice connections to the attendant terminals 127, while lines 122 provide voice grade connections to each of the SUs 123.

One important function offered by PBX 121 is incoming call queuing. When none of the lines 122 from PBX 121 to SUs 123 are available, the PBX puts the incoming calls in a queue, plays an announcement that tells the callers to stay on the line, and provides music-on-hold while the callers are waiting in the queue. The queuing announcement and the size of the queue are adjustable according to incoming traffic and time of day.

Another function performed by PBX 121 is the Automatic Call Distribution (ACD) function which distributes incoming calls to the lines 122 of the SUs 123. This function is needed to balance the load of multiple SUs. Each SU handles a plurality of lines. If a line is down, the ACD functions to skip that line and continue the call distribution.

A Server module 131 is defined herein as one of a plurality of identical software programs each of which controls the communications with one line connected to an SU. When a Server 131 detects a situation that needs attendant help in interfacing with a user, it makes a conference call to an attendant, at one of the attendant terminals 127, who then helps the user to complete the call. The same Server 131 will stay on the conference call until the user completes the call.

The SUs 123 provide the main call processing for CDS 120. Each SU 123 is an independent unit that processes incoming calls and delivers outgoing calls. Each SU 123 may also maintain and update message status table 700. All the SUs 123 communicate with each other and with the other components of the CDS 120 via LAN 124. Physically, an SU may include a processor with RAM memory, hard disks, a line printer, a LAN interface card, a monitor and Voice Power cards (which detect and send line signaling, play voice response to callers and record voice files). Each voice power card is connected to a different line 122 from PBX 121 to receive incoming calls as well as deliver outgoing calls. Each line 122 connection is controlled by a different Server 131.

When PBX 121 distributes a call to a waiting Server 131 at SU 123, the Server 131 answers the call and starts the incoming call processing in accordance with the functioning described in the flow charts of FIGS. 2-6. The Server 131 plays pre-recorded voice prompts (stored in SU 123) to direct the caller through the call flow. As will be described in the description of FIGS. 2-6, these prompts provide menus, help messages, questions, warnings, directions, and legal announcements to the user, so that the SU 123 can collect from the caller the information necessary to process the call.

The instructions and responses from the caller are sent to CDS 120, illustratively, in the form of Dual-Tone Multifrequency (DTMF) digits. A Server 131 collects the input DTMF digits and does the expected tasks according to the call flow logic of FIGS. 2-6. These input digits could be billing numbers, destination phone numbers, yes or no answers, etc. Obviously, Server 131 may also be arranged to respond to caller voice commands or other types of signaling.

The Server 131 also records voice files. Any digitized voice message in CDS 120 is called a voice file (901 of FIG. 9). Caller's name, recipient's name, recipient's response, and the caller's message are four illustrative voice files that Server 131 records. A copy of the voice files, along with the necessary message information, is sent to DBU 125 and SAU 128 for backup purposes. Both DBU 125 and SAU 128 include processor, RAM memory, hard disk, line printer, LAN interface card, and port cards.

Each SU 123 also has its own Data File 134 (FIG. 7) which contains a data record on every caller message recorded in that SU. Each data record is accessible using the billing code (e.g., billing number) for a message. The data record is also used for billing purposes.

A Server 131 delivers the call according to the information entered by the caller. An attendant (at a terminal 127) may be needed to detect answer supervision and perform call classification. The attendant may need to stay on the line to provide introductory prompts or person-to-person delivery, depending on the type of delivery.

Advantageously, CDS 120 may keep duplicate copies of Data File records in both local SUs and DBU 125. At the same time, DBU 125 acts as a central storage location for voice and data records from all SUs 123.

The DBU 125 includes processor, RAM memory, hard disk, line printer, LAN interface card, and port cards. DBU 125 is the central data storage location which has copies of the Data File 134 of every SU 123 in CDS 120. Thus, if an SU 123 needs to provide status for an incoming call, instead of querying all the SUs, it will query DBU 125 to get the statuses and the responses.

The DBU 125 has one scheduler 132 dedicated for each SU in the system. Each scheduler reads the data records from the memory, for all the recorded messages on its SU 123, and sends the ones that are awaiting deliveries or status notifications to available servers 131 on the SUs 123. Alternatively, SU 123 may be used to store and execute the data files 134 and scheduler 132 to take advantage of potential efficiencies and economies via decentralization of the CDS 120 architecture.

Several port cards of DBU 125, are designated for the purpose of validating commercial credit cards. When a request is received from a Server 131 for a commercial credit card validation, the DBU 125 dials via one of the lines 136 into a commercial credit card validation network 165, 166 (e.g., National Data Corporation) to validate the card number and to send the results back to the requesting Server 131.

Attendant Unit (AU) 126 assigns available attendants, receives call information, puts the information on the screen at the assigned terminal 127, and sends updated information back to the appropriate SU 123. One or more AU's 126 may be needed in CDS 120. Each AU 126 supports multiple terminals 127. An AU 126 may be an AT&T 6386E WGS including a processor with hard disk, line printer, LAN interface card, port cards, and several voice power cards. The AUs 126 are the main card validation vehicles for AT&T telephone-number-based cards. A validation process on the AUs 126 will perform the validation of telephone-number-based-billing card codes (calling card numbers). The validation is handled by an idle validation process on the AUs 126 through a request made by a Server 131 that is processing the particular incoming call on line 122. If no validation process is available on the AUs 126, the validation request will be overflown to a back-up validation process on the SUs 123.

When a Server 131 of SU 123 needs the help of an attendant, it sends out a request over LAN 124 to AU 126. If there is an attendant available, the attendant signals AU 126 that he/she is available. The information regarding the call handled by that Server 131 will be displayed on the terminal 127 of that attendant. If attendants on the first AU 126 are not available, Server 131 will try the second AU 126, if provided. If no attendant is available, the requests will be queued and Server 131 plays a message to ask the caller to hold.

Once the Server 131 of SU 123 finds out the phone number of the assigned attendant, it uses the conference call feature of the PBX 121 (System 85) to connect the attendant to the call. At the same time, the information about that call is shown on the attendant's terminal 127. An attendant is connected to a call flow to provide incoming call completion assistance and answer detection and message delivery. When the attendant is finished, the information collected through the terminal 127 is sent to the appropriate SU 123 by AU 126.

A caller using a rotary phone is identified by Server 131 of SU 123 at the beginning of the call flow. An attendant is brought in to assist the caller to complete the call. All the information is entered by the attendant through a terminal 127.

A caller using a touch-tone phone may have problems in completing a call. Either the Server 131 or the caller can initiate the request for an attendant to solve the problem. After the problem is solved, the attendant may continue entering the information for the caller or transferring the caller back to the Server 131.

If PBX 121 of CDS 120 does not pass answer supervision to one of the SUs 123 (i.e., a voice power card) thereat, attendants may be used to detect answer supervision and to perform call classification. For automatic message deliveries, once the answer supervision detection is done, the attendants are disconnected from the outgoing lines and become available for other calls. However, for attendant-introduced deliveries, the attendants will stay on the line to introduce the messages and then disconnect from the outgoing lines. For person-to-person message deliveries, the attendants have to stay on the line until the presence of recipients or message takers is confirmed.

LAN 124 transmits data among the SUs 123, the DBU 125, the AUs 126, and the SAU 128. Several types of messages are sent through LAN 124 including data records, attendant requests, call status, peer requests, system commands, recorded voice files (including the call response messages), log files and error records.

Call Status records are sent to SUs 123 from DBU 125 when a caller wants to know the statuses of all his/her call messages previously recorded.

If a call message has a response, a call response message is sent to the requesting SU for a status report from the DBU 125. An attendant request message is sent from SU 123 to the AU 126 to request an attendant. A call status message, which contains the information about an incoming call, is sent between SU 123 and AU 126. Peer request messages are sent among SU 123, AU 126 and DBU 125. They are used to request information about message records, message responses, billing code validations, etc. Finally, system command messages are sent from SAU 128 to other units in order to restore the service, fix a problem or change a parameter.

The recorded voice files are sent from SU 123 to DBU 125 and SAU 128 for backup purposes.

Log files (not shown) are sent to SAU 128 periodically from the other units of CDS 120. Log files, which can be used for detailed marketing or traffic analysis, record every action that has taken place between users and Servers 131 of SUs 123, and/or between users and the AUs 126 via the SUs 123.

Error records are received by SAU 128 from the other units of CDS 120. Error files are maintained by SAU 128 so the error statuses can be shown in the reports. Besides the reporting and testing functions, SAU 128 can also send system commands to change system parameters, restore files, and generate new processes.

As noted, SAU 128 receives data files, log files and error files from other units within CDS 120 and produces different on-line and off-line reports for system monitoring, testing, operations support, and customer interface purposes.

3. General Operational Overview

The previously described components of CDS 120 operate together with the components of CSN 100 in the manner described below to provide the operational features of the present invention. CDS 120 connects to the CSN 100 using trunks 116 and 151 from SN 115 and 152, respectively. Briefly, a call is routed through CSN 100 in the following manner. An incoming call (illustratively, an 800 type call) received from a caller at station 101 is routed to OSO 105. OSO 105 obtains the ACP 108 routing number from IDB/NCP 107 in a well-known manner. The call is routed to ACP 108 which obtains the APN (Action Point Number) routing number from DSD/NCP 110 in a well-known manner. The call is then routed via SN 115 to CDS 120.

In addition to receiving incoming calls from CSN 100, CDS 120 places outgoing calls through CSN 100. Outgoing calls may be placed to domestic area-based North American Numbering Plan (NANP) numbers, 800 numbers, International Long-Distance (ILD) dialable numbers, and ships via High Seas service, for message delivery and for status notification. CDS 120 also dials the appropriate validation systems 155 and 165 to do the validation for various types of calling cards and commercial credit cards.

In accordance with the present invention, callers that are not subscribers of CDS 120 can bill a voice message call (including a recipient response) to their billing code (e.g., a credit card number), record a message in their own voice, and schedule that message to be delivered at a later time to a specific station destination (i.e., phone number) or to a specific recipient party. CDS 120 is designed to accommodate callers who (1) have an immediate need to reach the intended recipient party but encounter a busy or ring/no answer condition at the terminating station and do not wish to keep trying to complete the call themselves; or (2) who cannot call the intended recipient party directly at a specified later time but still wish to send a message and receive a message delivery status or recipient response back.

CDS 120, illustratively, provides the callers with two ways of accessing the system. Callers can dial an 800 number to use CDS 120; or, when making an operator-assisted call, callers may be offered the opportunity, by the carrier's operator, to have the call transferred to CDS 120 upon encountering a busy or ring/no answer at the far end. In addition, overseas callers can also access the service by using one of four methods: International 800 service, USA Direct, High Seas service or foreign CDSs.

Once connected to CDS 120, callers can record a message and have that message sent to a specified destination phone number according to a defined standard delivery schedule, or callers can choose to customize the delivery instructions to include features such as customized delivery schedule, person-to-person call with or without message taker, request for recipient's reply, and status notification call. CDS 120 is equipped to handle callers who are accessing the service via DTMF (Dual-Tone Multi-Frequency) or via DP (Dial Pulse) signaling capabilities. Callers using DTMF signaling needing assistance at any point during the call flow can gain access to an attendant by pressing a special key sequence. Callers using DP signaling can gain access to an attendant after an initial timeout following the first CDS 120 prompt for the billing code or number.

Callers can also interrupt the CDS 120 prompts (by pressing a predetermined touch-tone key) and, as a result, bypass that prompt and invoke an expert mode with shorter prompts to allow those callers to proceed more quickly through the call flow. Special features may allow callers, upon entering certain specified touch-tone (TT) keys at the appropriate point in the call flow, to erase and re-record a message or to send the same message to several recipients. Caller access to the CDS and CDS access to the message recipient may be provided via tariffed services (e.g., MEGACOM 800 service).

4. Incoming Call-Automatic Set Up

A caller who would like to leave a message to be delivered to a specified phone number (or recipient) using CDS 120, gains access to the service by dialing the 800 number associated with CDS 120 (e.g., using MEGACOM 800 service). The step-by-step handling of the caller-dialed digits by CSN 100 is described as follows with joint reference to FIGS. 1, 2, 7 and 10.

Steps 201-204 enable a caller to bill a message delivery to his/her billing code (credit card number). In step 201, the caller, (also referred to herein as sender or originator) at station 101 dials 1-800-NXX-XXXX over facility 102 to access CDS 120. In step 202, the call is routed to CDS 120 as described in the following paragraphs.

The LEC routes the call over facility 104 to OSO 105. The OSO 105 sends a well-known query containing the 800 number and the originating Numbering Plan Area (NPA) over link 106 to an IDB-NCP (INWATS Database Network Control Point) 107. The IDB-NCP 107 returns a routing number of the form 195-WXY-NV'AZ over CCS link 106 to the OSO 105. The OSO 105 recognizes the prefix 195 as being associated with a MEGACOM 800 call and sends the call to ACP 108.

The ACP 108 queries a Direct Services Dialing (DSD) NCP 110, over CCS link 106, which sends back a routing number of the form SSS-TTT-XXXX. The ACP 108 routes the call over facility 111 to the terminating toll switch 112 based on the SSS digits. The terminating toll switch 112 translates the TTT digits to select the trunk subgroup associated with CDS 120 and, also, sets up the facility connection 114 to the service node 115 that connects to CDS 120. From SN 115 to CDS 120 the call is routed via LEC tariffed facilities 116.

At CDS 120, the call is first connected to PBX 121 which routes the call to an available line 122 from SU 123 (illustratively, an AT&T 6386E). SU 123 creates a data record in Data File (FIG. 7) as soon as the call is received. This data record, shown in FIG. 7, includes message status table 700, trace tables I and II (720 and 740) and call delivery table 770. SU 123 plays a welcoming announcement 801 (interruptible by the user entering digits on the touch-tone phone) and prompts the caller for a card number (step 203). A Server 131 of an SU 123 unit collects DTMF digits representing the caller's billing code (e.g., billing credit card number). If the proper number of billing code digits is obtained, SU 123, in step 204, sends a billing code validation request over LAN 124, to validation processes on either the AUs 126 or the SUs 123 (for overflowing AT&T cards traffic only) or the DBU 125 for commercial credit cards. The number and format of these billing code digits are checked against entries in table 801, which lists the various AT&T Calling Cards and commercial credit cards, to determine which billing service is to validate the billing code.

A commercial credit card validation network 165 (e.g., National Data Corporation) is used to validate commercial credit cards. The validation requests are handled by DBU 125. When a commercial credit card number is received, the Server 131 of an SU 123 requests DBU 125 to initiate the validation procedure. DBU 125 dials out over a port circuit to the appropriate validation network and sends the card number, expiration date, and the authorized amount through the connection. The credit card validation network (FIG. 1) translates the data and then sends the data to a bank database to validate the number. If a card number is valid, an authorization code will be sent back to DBU 125. If the number is not valid, an explanation of why it is not valid will be sent back. Once the dial-up port is connected, multiple requests can be sent for validation.

Validation of AT&T Calling Cards will be done via the inward validation method to a TSP/OSPS 155 which queries a BVA Database of NCP 159 for a valid/invalid response. The communication path involves facility 160, office 154, facility 164, office 112, facility 164, office 154, TSPS 155, facility 156, STP 157, facility 158 and NCP 159.

The format of an AT&T CAS CARD and its validation procedure is described in co-pending U.S. patent application Ser. No. 360,178 filed by V. A. Franco, and entitled "Method and Apparatus for Restricting Credit Card Communication Calls."

If invalid billing codes have been entered, in step 205, an attendant may be connected to the caller to provide additional instruction. If the billing code is valid, SU 123 checks, in step 206, for any available message status (message status table 700 of FIG. 7) by communicating with the DBU 125 via LAN 124. This check is based on the billing code and determines the message status of any previously transmitted messages billed to that billing code. If a billing code does not have an assigned message status table 700, one is assigned to the billing code in step 207. DBU 125 will maintain and update the message status table 700 as required. In step 207 the call is also billed to the billing code. If message (status) is available, step 208, the SU offers to the caller the choice of either listening to status or recording a new message.

If the caller chooses to listen to status, in step 209, SU 123 sequences through the appropriate status report for that billing code. There are five available status categories (see message status table 700) including:
1. messages scheduled for delivery, (701, 711)
2. messages currently being delivered, (702)
3. delivered messages and recipient response, (703, 706, 721, 722, 723, 724)
4. unsuccessful deliveries, (704, 726)
5. canceled messages (705, 752).

If there are any messages scheduled for delivery from that caller's billing code, SU 123 offers the caller the option of canceling that message. If a message is canceled under this category, its canceled status is updated in real time to be reflected back in the "canceled messages" category, 705.

After status is played once, step 210, the caller is offered the choice to review status one more time, step 211, or to record a new message, step 212. If the caller chooses to quit, the call is terminated. If the caller chooses to record a message, the caller presented, in step 207, with the option of having the caller's name recorded. If the record option is selected, the caller's name is stored as the message caller's name in step 214. After the caller's name recording option, step 207, the caller is prompted for the destination (recipient's) number in step 215. SU 123 then plays an appropriate announcement containing the recording instructions. SU 123 records the caller's voice message in step 216.

At the end of message recording, CDS 120 determines if the caller is still on the line, step 217. If so, the caller is asked, step 218, to specify the choice of either sending the message automatically based on the standard delivery schedule, step 219, or to specify further delivery instructions about the recorded message, step 220. The standard delivery schedule, described in a later step, basically consists of a certain number of attempts in a predefined time interval. The predefined interval starts right after the caller hangs up and continues for two hours. The caller-specified delivery instructions are described in a later step.

If, during step 217, the caller hangs up after message recording, SU 123 schedules the message delivery according to the standard delivery schedule, step 223.

At the end of the message recording, if the caller chooses to send the message automatically, step 219, based on the standard delivery schedule, the caller is asked, step 221, to either quit (hang up) or to record a new message. If the caller chooses to record a new additional message, step 222, the caller is returned to step 207. If the caller chooses to quit, the message is selected for immediate delivery, step 223.

If, during step 218, the caller chooses to specify further instructions, step 220, the caller is asked, in step 301, whether to cancel the recorded message or to choose special delivery features. If the caller wants to cancel the message, SU 123 proceeds with the cancellation, step 302, and plays back a confirmation announcement. The caller is then offered, in step 303, the option of hanging up, step 304, or recording a new message, step 305. If the caller chooses to record a new message, step 305, the caller is returned to step 207.

If, in step 301, the caller wants to specify special delivery features, the caller can choose among the following features including:
  (1) automatic delivery or attendant supervised delivery, step 306. Attendant delivery permits the option to record recipient's name (step 307) and a message taker option (step 308).
  (2) request for recipient's response, step 309,
  (3) request for a call from the system to notify the caller of the status of delivery and/or to send back the recipient's reply, step 310. The notification phone number is collected in step 311.
  (4) standard or customized delivery schedule, step 312 (date, time, duration are specified in steps 313, 314 and 315, respectively).

Various data as well as the caller's selected options associated with the message are stored in trace table 740 and are accessible using billing code 741. The destination number 751, message status 742, and various message information 743 are also stored in table 740. If the caller name option is selected, in step 213, an entry 744 is made in table 740. If the supervised option is selected in step 306, then an entry 745 is made in table 740. If the message taker option is selected, in step 308, then an entry 746 is made.

If the recipient response option is chosen, step 309, then an appropriate entry 747 is made. If the notification call option is selected in step 310, the caller provides, in step 311, the phone number where the notification is to be delivered. Again, an appropriate entry 748 is made in table 740. Whether or not a custom delivery schedule is selected, step 312, an appropriate entry 749 is made. If a custom delivery schedule is selected, a start date prompt, step 313, a start time prompt step 314, and a delivery duration prompt, step 315, are given to the caller. The respective entries from the caller are stored in the appropriate location of table 770. After going through the special delivery features (steps 309, 310, 312), the caller is offered the choice, step 316, of either terminating the call, step 317, or recording a new message, step 318. In either event, the recorded message is scheduled for delivery, respectively, in steps 317 and 318.

5. Attendant Set Up

CDS 120 permits both attendant call set up and attendant delivery capability (which includes attendant-introduced or supervised message delivery). For users without DTMF input capability (e.g., users with rotary phones), the message delivery instructions are entered in by a CDS attendant at one of the terminals 127. The attendant set up message call scenario follows in a manner similar to the previously described automatic call set up. For convenience, the equivalent automatic call set up steps are referenced to help describe the sequence of events in the attendant call set up scenarios.

The user dials 1-800-NXX-XXXX (CDS number). The call gets routed over the CSN as previously described. The call is first connected to PBX 121. PBX 121 routes the call to an available line from SU 123. SU 123 plays an announcement and prompts the caller for a billing code, step 203. The caller times out at this point because there is no DTMF input capability. The SU 123 communicates with the AU 126 to determine which attendant at one of the attendant terminals 127 is free to accept a call, step 200. Once an attendant is free, the serving unit 123 transfers all available call history data to the attendant's screen. The serving unit then bridges the attendant onto the call by putting the caller on hold and dialing the attendant's line number.

Once the attendant is on the call, the attendant collects the billing code, step 204, validates it, and offers the caller the opportunity to listen to status if status is available, step 206. If status is available, the caller may choose to listen to the call temporarily and have status played automatically, steps 209–211. In all cases, the attendant remains on the call to assist the caller with the status for messages scheduled for delivery because the caller may want to request a cancellation of these messages. If the caller informs the attendant that the caller would like to listen to status and then record a new message, step 212, the attendant sets a flag denoting an attendant re-connection is needed after status, before dropping off the call temporarily while status is being played.

After the caller has gone through status, the attendant starts the message delivery set up procedures. If status is not available, the attendant sets up a message status table for the caller using the billing code, step 207. The attendant has the caller record the caller's name if desired, step 214. The attendant collects the recipient's number, step 215. The attendant collects the information for special delivery features if the caller so requested, steps 301–315.

Before dropping of to let the caller record the message, the attendant asks the caller if he/she wishes to record a subsequent message after the current one, step 316. If the caller indicates a positive response, the attendant sets a flag for an attendant re-connection after message recording.

6. Message Delivery

The message delivery sequence for CDS 120 is described with joint reference to FIGS. 1, 4, 5 and 7. At message delivery time, step 401, SU 123 secures, in step 402, an outgoing line and an available CDS attendant. SU 123 outpulses a call, step 403, to the message recipient's number through PBX 121. The attendant monitors the call progress, in step 404. If the call is not answered, step 404, the attendant enters the proper key for the correct call disposition (busy, ring/no answer, network busy/failure, number no longer in service announcements). While not described herein, it is contemplated that the attendant call-answer monitoring function described above can be performed automatically by appropriate circuitry.

Based on the call disposition, SU 123 reschedules, step 406, the next call attempt according to the message delivery algorithm. If, in step 405, the delivery window has expired, then in step 407, the attendant records the delivery as unsuccessful in 706 of message status table 700. If the call is answered, in step 404, the attendant indicates to SU 123 (via AU 126 and LAN 124) to start the automatic play mode. In step 408, the system checks if an automatic delivery was requested by checking entry 745 of table 740.

If no attendant delivery is requested, then the attendant drops off from the call in step 409. In step 410, the system checks (entry 744 of table 740) if the caller's name has been pre-recorded. If so, in step 411 the caller's pre-recorded name (902 of Voice File 901) is played to the recipient. Thereafter, in step 412 the caller's message (905) is played. If the caller's name is not available, in step 413, a CDS message and the caller's message is played to the recipient.

A check is made, in step 414, to determine if a recipient reply is requested. In the case where a reply is requested, (as determined by the status of 747 of table 740) the CDS announcement, step 415, also informs the recipient that a reply can be recorded at the end of the caller's message. The caller's message may be played one or more times in steps 416-417.

If a recipient's reply is requested, in step 418, the recipient hears an announcement, in step 419, and a tone in step 420, prompting for the recording of the recipient's response. In step 421, the response (reply) is recorded accordingly and stored in 904 of Voice File 901. In step 422, SU 123 determines if a response has been recorded. This may be determined by detecting recipient speech during a certain time interval. If a reply is recorded, in step 423, SU 123 plays a concluding announcement, terminates the call, makes a message delivered entry 703 and 724, respectively, in tables 700 and 720, and makes a reply obtained entry 723 in table 720. In step 424, if SU 123 detects no reply, an announcement is played, the call terminated and marked as delivery successful/no reply in 706 of table 700.

In step 418, if no reply was requested, then in step 425, the system marks the delivery successful in 703 of table 700.

Whether the message was delivered unsuccessfully, step 407, or successfully, steps 423, 424, and 425, SU 123 checks, in step 426, to determine if a notification call was requested. If not requested, then in step 427 the status is stored in the data base for a predetermined time (e.g., 24 hours, starting at the time of a successful delivery or at the end of the delivery window on unsuccessful calls). If requested, then in step 428 the SU 123 schedules a notification call according to a notification call algorithm. If a notification call is requested, in step 429, the message status, including replies, is also stored in the database for 24 hours, starting at the time of a successful delivery or at the end of the delivery window on unsuccessful calls. Note, a notification call request results in CDS 120 calling back the caller at the stored notification predefined telephone station, otherwise the caller must call CDS 120 to determine call status.

Returning to step 408, if the message delivery is not automatic then the message is an attendant-type delivery. In step 441, CDS 120 checks if the voice message is an attendant-introduced or supervised delivery. If an attendant-introduced delivery, then in step 442, the attendant makes the introduction announcement to the answering party or answering machine that answers the call at the recipient's location. Note, the answering party may or may not be the recipient party. In step 409, the attendant initiates the playing of the caller's message and then drops off from the call.

If the message delivery is an attendant-supervised delivery, CDS 120 checks, in step 501, if any prerecorded names must be played. If so, in step 503, the caller's name is played in the introductory message; otherwise, in step 502, attendant can say the caller's name and the recipient's name to the answering party. In step 504, the attendant inquires if the designated recipient is available. If so, then in step 509, the attendant waits for the recipient to answer the call and then presses the auto-message delivery key and drops off the call. CDS 120 then checks in step 414, to determine if a recipient reply is requested. Where a reply is requested, an announcement in step 415 informs the recipient that a reply can be recorded at the end of the caller's message. CDS 120 then delivers the caller's message to the recipient, one or more times, in steps 416 and 417. Again, CDS 120 thereafter inquires if the caller requested a reply, as previously described in step 418.

In step 504, if the recipient is not available, then, in step 505, CDS 120 checks if the message-taker option was selected by the caller. If so, in step 506, the attendant asks if the answering party can take the message. If yes, then, in step 509, attendant pushes the auto-message key and drops off the call. SU 123 makes an appropriate entry, 722 in table 720. If the answering party can't take the message, CDS 120 determines, in step 507, if a special condition exists (e.g., called party refuses to take/receive the message). If so, the attendant presses the special condition key, in step 508.

Following the activation of the special condition key, or if no message-taker option was selected, or if no special condition exists, the attendant, in step 510, determines if the answering party gave a time when the recipient may be available. If so, in step 514, the attendant enters the retry time in table 770. In step 515, the clock time is compared to the stop time 772 of table 770 (latest message delivery time). If the clock time exceeds the stop time, then in step 516, the delivery is marked as unsuccessful--recipient not available in entry 704 of table 700. If the clock time is less than the stop time, then, in step 515, the call is rescheduled at the retry time of step 514.

In step 510, if no retry time was specified by the answering party, then CDS 120 checks, in step 511, if the wrong recipient telephone number was given by the caller. If a wrong number was given, then in step 518 the attendant asks if a call forwarding number is available. If so, then the attendant enters the new number and drops off the call in Step 519. In step 515 CDS 120 checks if the clock time has exceeded the stop time. However, if in step 518 no call forwarding number is given, then in step 512 the attendant presses the wrong number key and drops off the call. In step 513, the CDS 120 marks the call as an unsuccessful delivery--wrong number in entry 704 of table 700. If there was no wrong number, then CDS 120 returns to step 515 to check if the clock time has exceeded the stop time.

An alternate message delivery method can be used for message deliveries to locations staffed by attendants or operators (such as High Seas operators). In those cases, the attendants at terminals 129 of the CDS 120 will relay a specific voice message call identification (FIG. 10) for later referral and retrieval of the appropriate voice message when the operator (e.g., High Seas) has established a connection to the specified delivery location or person.

7. Status Notification Call

Figure 6:
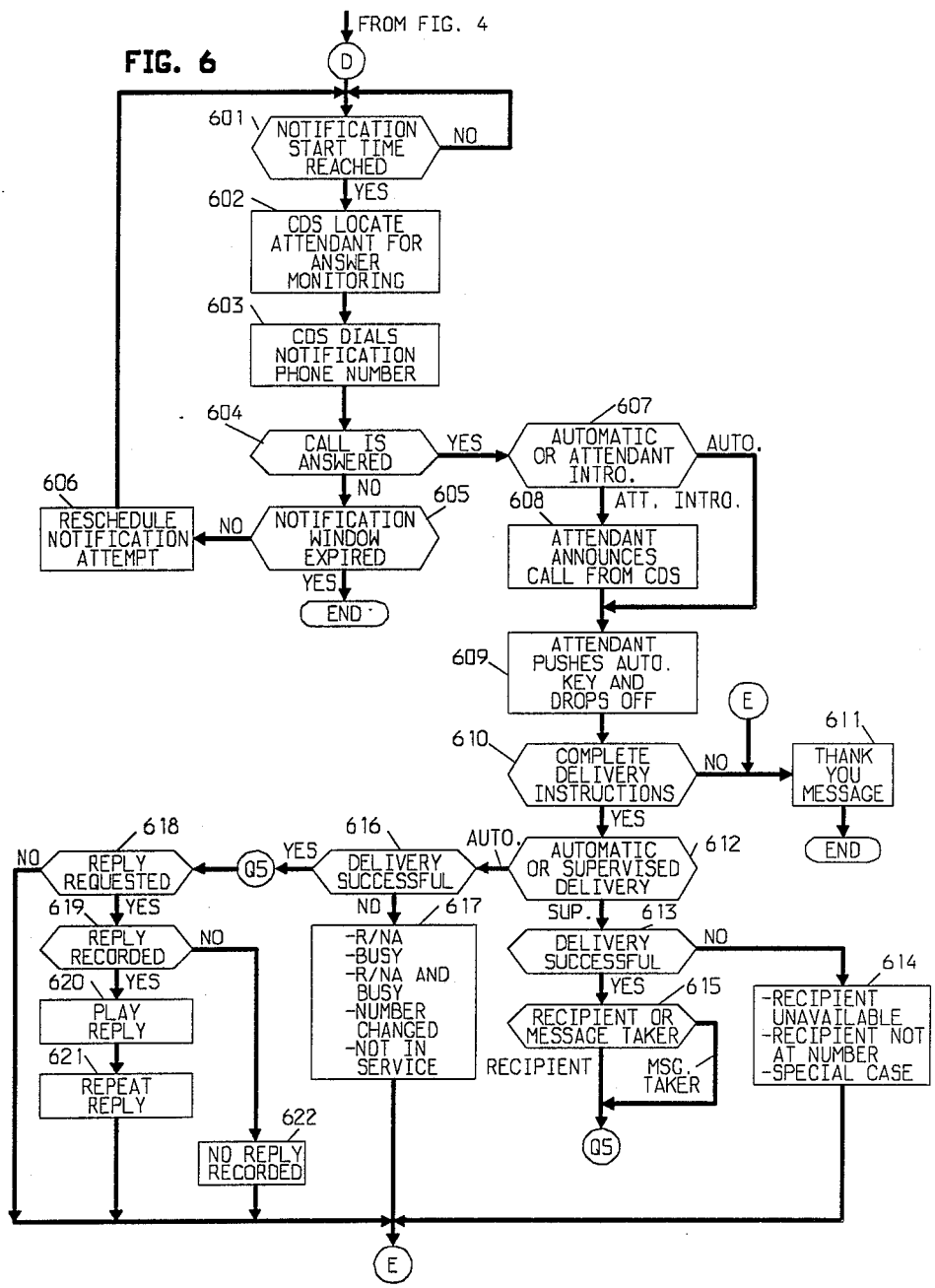

With reference to FIG. 6, we describe the outgoing status notification call sequence. As previously noted, the status notification call is an optional feature selected by the caller (entry 748 of table 740). Prior to step 601, entry 707 of status table 700 indicates a status notification is waiting to be selected. In step 601, SU 123 periodically checks if the caller designated notification time (stored in 773 of table 770) has been reached. When the start time is reached, in step 602, CDS 120 locates a free attendant for call answer monitoring assistance. (Note, it is anticipated that voice recognition equipment may be utilized to replace this particular attendant function). The entry 710 of status table 700 is set indicating that a status notification is attempting delivery. In step 603, CDS 120 dials the call originator's (i.e., caller's) notification phone number obtained from table 704. In step 514 the attendant monitors the call.

If the call is not answered, in step 605, SU 123 checks if the notification window (stop time 773 of table 770) has expired. If expired, the call is ended. If the notification window has not expired, then in step 606 a notification attempt is rescheduled a predetermined time later and entry 708 of status table 700 is set.

When the call is answered SU 123 checks, in step 607, if the call is to be automatically handled or attendant-introduced by checking entry 745 of table 740. If attendant-introduced, then in step 608 the attendant introduces or announces to the answering party that a notification call is received from CDS 120. If automatic, CDS 120 plays a similar announcement. In step 609, the attendant pushes the automatic key and drops off the call at which time a carrier introductory message is played. In step 610, SU 123 checks if the delivery instructions were completed. If not, then a carrier thank-you message is played, step 611, and the call is terminated or ended.

If the delivery instructions were completed, in step 612, SU 123 checks (using entry 745 of table 740) if the call is automatic or supervised. If supervised, then in step 613 the message delivery status (entries 703, 704, 706 of status table 700) is checked. If there was no successful message delivery, in step 614, an appropriate message is played to the answering party. This message may indicate that the recipient was unavailable, not at the recipient number, or other special circumstances. Thereafter, in step 611, the carrier thank-you message is played and the call ended.

If the message delivery was successful then, in step 615, the attendant inquires if the answering party is a designated notification recipient (i.e., the caller who sent the message). If so, one type of CDS message is played to the recipient. If not, then the message taker receives a different CDS message. Then step 618 is followed as described later.

If an automatic delivery was scheduled, then in step 616 the delivery status is checked. If the message delivery was unsuccessful, SU 123 in step 616 plays an appropriate CDS message which indicates the reason for the non-delivery. The reasons include: no answer, busy, no answer and busy, number not in service or number changed. Again, a carrier thank-you message is played, in step 611, and the call is ended.

If the message was delivered successfully, SU 123 checks if a recipient reply was requested by checking entry 747 of table 740. If no reply requested, then the carrier thank-you message is played in step 611 and the call is ended. If a reply was requested, SU 123 checks, in step 619, entry 723 of table 720 to determine if a reply was recorded. If so, SU 123 plays a system message and then the reply in step 620. The reply is then repeated in step 621 and, again step 611 ends the call. If no reply was recorded, then in step 622, SU 123 plays a CDS message indicating such to the answering party. Again, the call is ended via step 611.

While the present invention has been described in the context of voice message delivery, it should be understood that it could also be applied to the delivery of a combination of voice/data messages. Moreover, while the call recipient and answering party were described as being persons, it is contemplated that various equipment may be substituted therefore. Thus, the call origination or the call destination need not be a station set (e.g., 163) but could be other apparatus which may incorporate answering machines, play-back units or other call completion equipment arranged to interface with the present invention in accordance with the above detailed description. Alternatively, while connection to the invention described herein was shown via a common carrier network (100), connection could also be made via a LEC office (103), or by a common carrier office (100) and thence to a LEC office (103). Thus, what has been described is a preferred embodiment of the invention. Other methods, sequences or arrangements can be used to implement the present invention by those skilled in the art without departing from the spirit and scope of the present invention.

We claim:

1. A method of operating a call delivery system for use with a common carrier network for serving stations connectable to said network, comprising the steps of:
   enabling a caller, at a station calling a called station to bill, to a billing code of the caller, a call request to deliver a voice message from said calling station;
   establishing, in response to said request, a status memory location identifiable using said caller's billing code and storing therein a status message indicating a status of said request; and
   in response to a subsequent call from the caller, checking said status memory location using the caller's billing code and outputting the status message to the caller.

2. The method of claim 1 further including the step of recording said caller's voice message at a memory location identifiable using said caller's billing code.

3. The method of claim 1 further including the step of recording said caller's voice message at a memory location identifiable using a system specified message identification code.

4. The method of claim 1 wherein information entered into the system during the enabling step is entered with the assistance of a system attendant.

5. The method of claim 1 further including the steps of
   delivering said voice message to said called station and
   updating said status message to indicate the results of said delivering step.

6. The method of claim 5 wherein the caller selects the time for the performance of said delivering step.

7. The method of claim 5 wherein said enabling step enables the caller to receive a voice message response from a party at said called station, and
   wherein the method includes the steps of
   in response to a successful delivery step, recording a voice message response from said party at said called station; and
   playing said voice message response to said caller following said subsequent call therefrom.

8. The method of claim 5 further including the step of playing, prior to said delivering step, a pre-recorded system message at the destination station announcing the receipt of said voice message.

9. The method of claim 1 wherein said status message includes a pre-recorded system message.

10. The method of claim 1 wherein said subsequent call from said caller is a second call request to deliver a second voice message.

11. The method of claim 1 wherein said enabling step enables the caller to request a status notification call from the system, and wherein the method includes the further steps of
collecting from the caller the number identifying a station that is to receive the status notification call; and subsequently notifying the identified station of the status notification call and outputting the status message thereat.

12. The method of claim 11 wherein the caller selects a notification time when the system is to enable said notifying step.

13. The method of claim 1 wherein said recording step includes recording the caller's name for output with said voice message.

14. The method of claim 1 wherein said enabling step includes the step of verifying the caller's billing code by using a billing validation service provided by said network.

15. The method of claim 1 wherein said caller's billing code is obtained from a non-telephone-number-based credit card.

16. The method of claim 1 wherein said caller's billing code is obtained from a telephone-number-based credit card.

17. A call delivery system, for use with a common carrier network for delivering voice messages to stations connectable to said network;

means for receiving a call from a caller requesting to bill to a caller's billing code a voice message call to a called station;

data base means responsive to said received voice message call for storing in a status memory location, identifiable using said caller's billing code, a status message indicating the status of a voice message call and for storing said voice message in a voice file identifiable using said caller's billing code; and processor means responsive to a subsequent call inquiry from said caller for checking said status memory location using the caller's billing code and outputting the status message to the caller.

18. The call delivery system of claim 17 wherein said processor means is responsive to a message delivery time specified by said caller for initiating message delivery to the called station, and wherein said processor means updates said status memory location to indicate the results of the message delivery.

19. The call delivery system of claim 17 wherein said processor means is responsive to said caller requesting a voice message response following the delivery of said voice message call to the called station for recording said voice message response and outputting said voice message response to said caller following a status inquiry therefrom.

20. The call delivery system of claim 17 wherein said database means stores a plurality of pre-recorded system voice messages and, wherein said processor means selects one of said system messages for output to a party at a station set connected to said system prior to outputting any status message to said party.

21. A call processing method for a common carrier network arrangement including a call delivery system for serving stations connectable to said network, the method comprising the steps of:

enabling a caller, who is not a subscriber of said network, at a station calling a called station to bill to a credit card number a request to deliver a voice message receivable from said calling station;

establishing, in response to receipt of said request, a memory location identifiable using said credit card number for storing said voice message and the status of said request;

attempting a subsequent delivery of said message to said called station;

recording a status of said attempting delivery step in said status memory location; and in response to a subsequent call from the caller using said credit card number, checking said memory location and outputting the status to the caller.

22. The method of claim 21 wherein said enabling step enables the caller to receive a voice message response from a party at said called station, and wherein the method includes the steps of
in response to a successful delivery step, recording a voice message response from said party at said called station; and outputting said voice message response to said caller following a subsequent call therefrom.

23. The method of claim 21 wherein said enabling step enables the caller to receive a status notification call, and wherein the method includes the steps of
collecting from the caller the number identifying a station that is to receive the status notification call; and subsequently establishing a status notification call to the identified station and outputting the status thereat.

* * * * *